United States Patent
Herzog

(10) Patent No.: US 6,265,502 B1
(45) Date of Patent: Jul. 24, 2001

(54) START-UP POLYMERIZATION PROCESS

(75) Inventor: Marc Herzog, Sausset les Pins (FR)

(73) Assignee: BP Chemicals Limited, London (GB)

(*) Notice: Subject to any disclaimer, the term of this patent is extended or adjusted under 35 U.S.C. 154(b) by 0 days.

(21) Appl. No.: 09/593,926

(22) Filed: Jun. 15, 2000

Related U.S. Application Data

(63) Continuation of application No. PCT/GB98/03735, filed on Dec. 14, 1998.

(30) Foreign Application Priority Data

Dec. 16, 1997 (FR) .................................................. 97 16209

(51) Int. Cl.[7] ...................................................... C08F 2/00
(52) U.S. Cl. ............................... 526/88; 526/61; 526/116; 526/901; 526/905; 526/125
(58) Field of Search ............................. 526/61, 116, 901, 526/905, 125, 88

(56) References Cited

U.S. PATENT DOCUMENTS 5,077,358 * 12/1991 Durand et al. ....................... 526/125

FOREIGN PATENT DOCUMENTS 0 130 607    1/1985 (EP) .
WO 96/39450  12/1996 (WO) .

* cited by examiner

*Primary Examiner*—David W. Wu
*Assistant Examiner*—William Cheung
(74) *Attorney, Agent, or Firm*—Finnegan, Henderson, Farabow, Garrett and Dunner, L.L.P.

(57) ABSTRACT

The subject-matter of the present invention is thus a process for starting up a gas phase olefin polymerisation reaction carried out using a Ziegler-Natta type catalyst based on a transition metal in a fluidized-bed reactor, through which passes a reaction gas mixture comprising the olefin, an inert gas, hydrogen and optionally at least one comonomer and which operates under conditions of temperature and pressure which make it possible to start up the polymerization, characterized in that the partial pressure of the olefin and the rate of introduction of catalyst into the reactor are increased whilst maintaining the ratios of the partial pressures of the olefin to the hydrogen and to the optional comonomer or comonomers substantially constant.

9 Claims, 1 Drawing Sheet

START-UP POLYMERIZATION PROCESS

This application is a continuation of international application number PCT/GB98/03735, filed Dec. 14, 1998, the content of which is incorporated herein by reference.

BACKGROUND OF THE INVENTION

The present invention relates to a process for starting up a reaction for the polymerization of an olefin in the gas phase in a fluidized bed in the presence of a catalyst of Ziegler-Natta type.

It has been observed that when the polymerization of an olefin is carried out in the gas phase in a fluidized bed, the formation of agglomerates and/or of polymer of an undesirable quality can often take place at the time of start-up of the polymerization. This appears in particular after having begun to introduce the catalyst into the fluidized bed and up to the time when a certain amount of polymer is produced, in particular up to the time when a stable level of full hourly production of polymer is achieved, that is to say the maximum level of hourly production desired.

It has also been observed that, during the start-up period, the instability of the polymerization conditions in a fluidized bed often leads to uncontrolled reactions and the formation of agglomerates.

A novel process for starting up a reaction for the polymerization of an olefin in the gas phase carried out in a fluidized-bed reactor has now been found which makes it possible to solve the problems mentioned previously. More particularly, the process of the invention makes it possible to initiate a polymerization reaction with a very limited, indeed zero, formation of agglomerates.

SUMMARY OF THE INVENTION

According to the present invention there is provided a process for starting up a gas phase olefin polymerisation reaction carried out using a Ziegler-Natta type catalyst based on a transition metal in a fluidized-bed reactor, through which passes a reaction gas mixture comprising the olefin, an inert gas, hydrogen and optionally at least one comonomer and which operates under conditions of temperature and pressure which make it possible to start up the polymerization reaction, characterized in that the partial pressure of the olefin and the rate of introduction of catalyst into the reactor are increased whilst maintaining the ratios of the partial pressures of the olefin to the hydrogen and to the optional comonomer or comonomers substantially constant.

DESCRIPTION OF THE INVENTION

Figure 1:
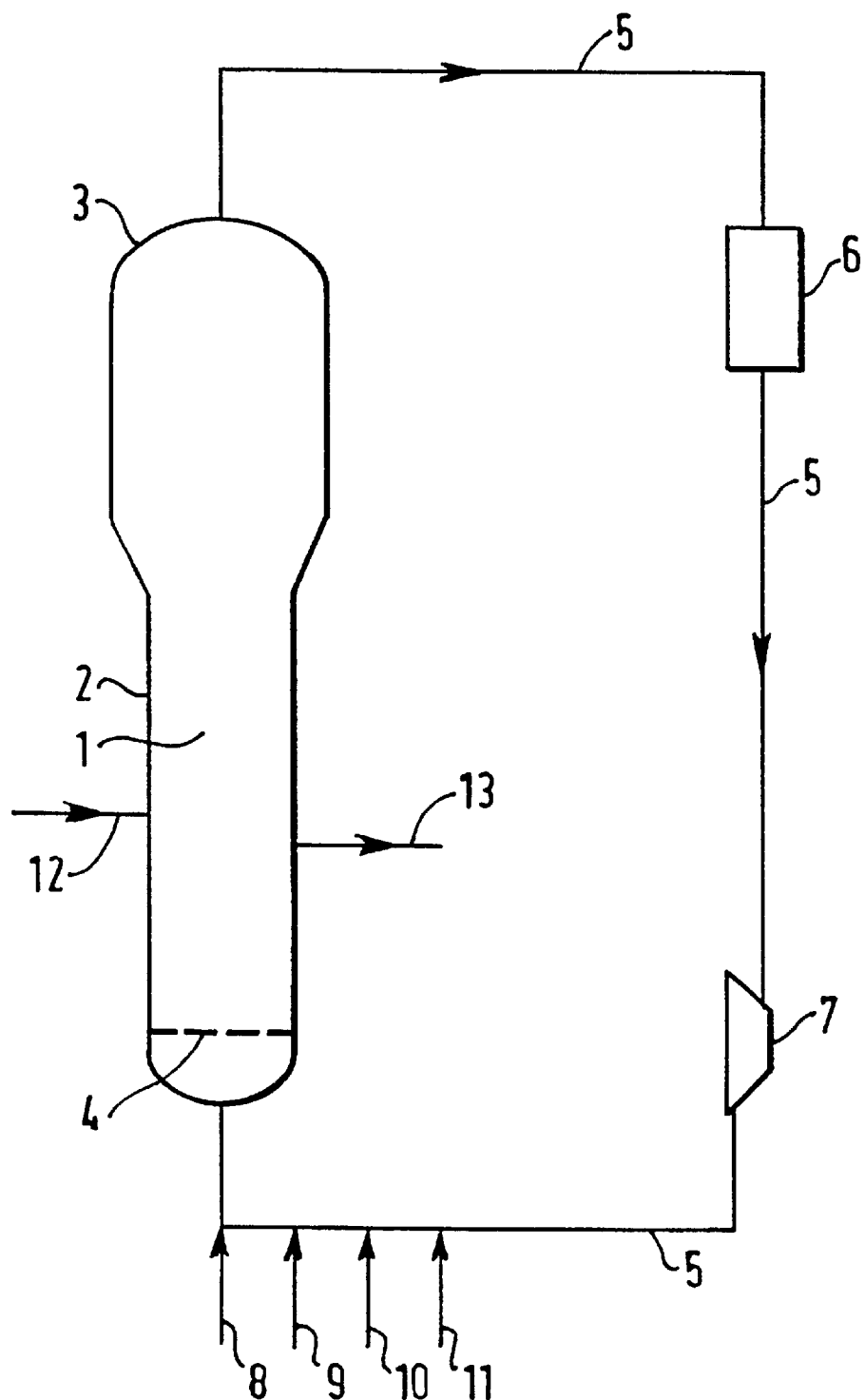
FIG. 1 diagrammatically illustrates a fluidized-bed, gas-phase polymerization reactor suitable for use with the present invention.

With respect to the present invention, the period for starting up the reaction is the period which passes between the time at which the introduction of the catalyst into the fluidized-bed is begun and the time at which the desired level of hourly production of polymer is reached. This means that the start-up period is a period during which the hourly production of polymer is increased until a maximum level of hourly production is obtained. Consequently, this start-up period is immediately followed by a period of hourly production during which the aim is to maintain a substantially constant hourly production of polymer. The start-up period can advantageously be preceded by one or more purification periods, during which the reactor is freed as far as possible from impurities, such as oxygen or water, which poison the catalyst. The purification of the reactor can be carried out as indicated in European Patent Application EP-A-0180420.

The total duration, T, of the start-up period can vary according to the size of the reactor. With industrial-scale reactors, it can be between 1 hour and 72 hours, preferably between 10 and 48 hours.

During the start-up period, the rate of introduction of catalyst and the partial pressure of the olefin are gradually increased in order to gradually increase the hourly production of polymer. These increases in the rate of introduction and olefin partial pressure can take place continuously or virtually continuously, for example in successive stages. However, it is possible to bring about one or more stationary phases, during which the rate of introduction of the catalyst and the olefin partial pressure are kept substantially constant and during which the hourly production of polymer can itself also be kept substantially constant. The process of the invention can advantageously comprise an initial stationary phase at the beginning of the start-up period, during which the rate of introduction of catalyst and the olefin partial pressure are kept substantially constant. This initial stationary phase is generally followed by gradual increases in the olefin partial pressure and in the rate of introduction of catalyst and an increase in the hourly production of polymer. The duration of a stationary phase, in particular of the initial stationary phase, can be between 0.5 hour and 48 hours, preferably between 1 and 24 hours. At the end of the start-up period, the throughput for introduction of catalyst is kept constant at the value set for obtaining the desired hourly production of polymer. This value can be between 1.2 and 10 times, preferably between 1.5 and 5 times, greater than that set at the beginning of the start-up period.

Catalyst is introduced into the reactor continuously or discontinuously. Catalyst can be introduced in particular using the equipment described in French Patent No. 2,562,077 or in French Patent No. 2,705,252.

During the start-up period, the content of transition metal in the polymer produced is preferably constant. It can range from I to ppm, preferably between 2 and 10 ppm.

According to the present invention, the ratios of the partial pressures of the olefin to the hydrogen and to the possible comonomer or comonomers respectively are kept constant as soon as the throughput for introduction of catalyst is increased. In practice, these ratios are kept constant throughout the start-up period. By way of example, the ratio of the partial pressure of hydrogen to the partial pressure of the olefin can be between 0.05 and 2, preferably between 0.1 and 1.5. Moreover, the ratio of the partial pressure of a comonomer to the partial pressure of the olefin can be between 0 and 1, preferably between 0.0001 and 0.6.

During the start-up period, the partial pressure of one of the constituents of the reaction gas mixture can be stopped simultaneously or not when the increase in the throughput for introduction of catalyst is momentarily halted, for example to achieve a stationary phase, or when the desired maximum hourly production of polymer has been reached.

A partial pressure can be increased with a multiplying factor ranging from 1.05 to 2.5, preferably from 1.1 to 2.1, with respect to the initial partial pressure existing in the reaction gas mixture at the time of beginning the start-up period, and the increase in a partial pressure can finally reach the partial pressure corresponding to that of the desired maximum hourly production of polymer.

By way of example, the initial partial pressure of the olefin can be between 0.2 and 1 MPa, preferably between 0.3 and 0.9 MPa, whereas the final partial pressure at the end of the start-up period can be between 0.3 and 1.5 MPa, preferably between 0.4 and 1.3 MPa. Partial pressure is generally increased with a rate less than or equal to 0.05 MPa/h. Usually, the duration of the olefin partial pressure increase applied during the start-up period can range from 0.1 T to T, preferably from 0.2 T to 0.8 T.

Throughout the start-up period, the total pressure of the gas mixture which moves through the reactor must be sufficient to be able to provide for the fluidization of the polymer particles in the process of formation constituting the fluidized bed. Furthermore, the fluidization rate must not be excessively high, in order to avoid entrainment of particles, in particular of catalyst particles, outside the fluidized bed. The entrainment of particles is to be avoided, in particular at the beginning of the start-up period.

The start-up period can advantageously comprise a gradual increase in the total pressure of the reaction gas mixture, for example according to a duration equivalent to at least 0.1 T and at most T, preferably at least 0.2 T and at most 0.95 T, and with a multiplying factor ranging from 1.1 to 3, preferably from 1.2 to 2.5, with respect to the initial total pressure of the reaction gas mixture at the time of beginning the start-up period, in order finally to reach the total pressure corresponding to that of the desired maximum hourly production of polymer. The increase in the total pressure preferably begins from the beginning of the introduction of the catalyst and in particular in parallel with the increase in the throughput of catalyst and that of the partial pressures of the olefin, of the hydrogen and of the optional comonomer or comonomers. The total pressure can be increased partly by increasing the partial pressure of the inert gas. The increase in the total pressure can be stopped simultaneously with or separately from the other increases.

Generally, the initial total pressure can be between 0.5 and 2 MPa and be from 0.1 to 0.5 MPa lower than the final total pressure. The final total pressure can be between 0.5 and 5 MPa, preferably 1.5 and 2.5 MPa.

At the beginning of the start-up period, the fluidized bed may contain or essentially comprise a charging powder, that is to say a preferably inactive polymer powder which originates from a previous reaction. The initial height of the fluidized bed is advantageously low. It can represent from 30 to 60% of the desired final height at the end of the start-up period. However, the height of the initial bed can already be at its final maximum height. Polymer is generally withdrawn as soon as the fluidized bed is at its maximum height. During the start-up period, the height of the fluidized bed can advantageously be gradually increased, for example over a duration equivalent to at least 0.1 T and at most T, preferably at least 0.2 T and at most 0.8 T, and with a multiplying factor ranging from 1.5 to 5, preferably from 2 to 4, with respect to the initial height of the fluidized bed at the time of beginning the start-up period, in order finally to reach the height of the fluidized bed corresponding to that of the desired maximum hourly production of polymer. The increase in the height of the fluidized bed preferably begins from the beginning of the introduction of the catalyst and in particular simultaneously with all or part of the other increases. The increase in the height of the fluidized bed can be stopped simultaneously with or separately from the other increases, while observing the abovementioned durations.

The fluidization rate can be constant during the start-up period. However, the process of the invention can also advantageously comprise a gradual increase in the fluidization rate, for example over a duration equivalent to at least 0.1 T and at most T, preferably at least 0.2 T and at most 0.8 T, and with a multiplying factor ranging from 1.05 to 1.5, preferably from 1.1 to 1.4, with respect to the initial fluidization rate at the time of beginning the start-up period, in order finally to reach the fluidization rate corresponding to that of the desired maximum hourly production of polymer. The increase in the fluidization rate preferably begins from the beginning of the introduction of the catalyst and in particular simultaneously with all or part of the other increases. The increase in the fluidization rate can be stopped simultaneously with or separately from the other increases, while observing the abovementioned durations. The fluidization rate can advantageously be increased in parallel with an increase in the height of the fluidized bed. In practice, the initial fluidization rate can range from 35 to 50 cm/s; the final fluidization rate can range from 45 to 80 cm/s. The fluidization rate is generally increased with a rate less than or equal to 1 cm/s/h, preferably less than or equal to 0.5 cm/s/h.

The polymerization temperature can be substantially constant during the start-up period. However, in some cases, in particular during the hourly production of high-density polyethylene, the polymerization temperature can advantageously be gradually increased during the start-up period. Thus, the duration of the increase in the temperature can be equivalent to at least 0.1 T and at most T, with a multiplying factor ranging from 1.02 to 1.3, preferably from 1.05 to 1.2, with respect to the initial polymerization temperature of the fluidized bed at the time of beginning the start-up period, in order finally to reach the polymerization temperature corresponding to that of the desired maximum hourly production of polymer. The increase in the temperature preferably begins from the beginning of the introduction of the catalyst and in particular simultaneously with all or part of the other increases. The initial polymerization temperature can range from 10 to 170° C., preferably from 85 to 100° C. The final temperature can range from 30 to 180° C., preferably from 90 to 120° C., according to the quality of the polymer manufactured. The temperature is generally increased at a rate less than or equal to 1° C./h, preferably less than or equal to 0.5° C./h.

The composition of the reaction gas mixture which passes through the fluidized bed is generally not strictly constant during the start-up period. It is advantageously set prior to the start-up period and can subsequently slowly change, in particular when there is a variation in the total pressure.

The reaction gas mixture contains an olefin which can have, for example, from 2 to 10 carbon atoms, such as ethylene, propylene, 1-butene, 1-hexene or 4 methyl-1-pentene. It contains an inert gas which is generally nitrogen or an alkane, for example having from 1 to 8, preferably from 2 to 6, carbon atoms, such as pentane and/or isopentane. It also contains hydrogen. It can optionally contain a comonomer during copolymerization of the olefin. The comonomer is an olefin other than the main olefin and can also have from 2 to 10 carbon atoms. Generally, ethylene is copolymerized with one or more alpha-olefins having from 3 to 8 carbon atoms and optionally with a diene.

The hourly production by volume of polymer, that is to say the amount of polymer produced per hour and per $m^3$ of fluidized bed, is relatively low at the beginning of the start-up period. It is generally less than 20 $kg/m^3/h$. It increases throughout the start-up period to reach approximately from 50 to 200 $kg/m^3/h$ in the period of desired maximum hourly production. The increase in hourly production by volume of polymer must not be excessively high at the very beginning of the start-up period. It is generally kept at a value of less than 10, preferably of less than 5 kg/m$^3$/h/h. During the start-up period, it can advantageously be increased to reach another constant value. The latter is preferably between 3 and 10 kg/m$^3$ /h/h for industrial-scale reactors, that is to say for reactors which can have an hourly production of at least 2 t of polymer.

As with the increase in the throughput for introduction of catalyst into the reactor, all the increases in the other quantities in the polymerization reaction which are mentioned above can take place continuously or virtually continuously, for example via successive stages. They can also take place via successive stationary phases, during which a quantity is kept constant or substantially constant.

A Ziegler-Natta type catalyst is understood to mean a catalyst which comprises at least one transition metal chosen, for example, from titanium, vanadium, chromium, zirconium or hafnium. This catalyst can optionally comprise a magnesium halide, such as magnesium chloride or bromide, and/or a support based on a refractory oxide, such as silica or alumina. In particular a catalyst comprising titanium and/or vanadium, halogen and magnesium atoms can be used. It is also possible to use a metallocene-based catalyst comprising at least one zirconium, titanium or hafnium atom, such as, for example, those described in EP 129368, U.S. Pat. No. 5,324,800 and EP 206794. It is also possible to use a catalyst containing a heteroatom bonded to a monocyclopentadienyl, such as, for example, the catalysts described in EP 416815 and EP 420436.

The catalyst is in principle used in conjunction with a cocatalyst which is an organometallic compound of a metal from Groups I to III of the Periodic Classification of the Elements, such as aluminum, boron, zinc or magnesium. For example, the cocatalyst can be an organoaluminium compound, such as a trialkylaluminium or an aluminoxane. Throughout the start-up period, the introduction of cocatalyst into the reactor is advantageously carried out so as to keep the cocatalyst to catalyst molar ratio constant. This ratio is preferably between 1 and 100. However, when a metallocene catalyst is used, this ratio can range from 1:10,000 to 10,000:1.

The catalyst can be used as is or optionally in the form of a prepolymer containing, for example, from 0.1 to 200 g, preferably from to 100 g, of polymer per gram of transition metal. The process of the invention is particularly suited to the use of a non-prepolymerized catalyst.

For the purposes of the present invention polymerisation using a Ziegler-Natta type catalyst excludes the use of a chromium oxide type catalyst (also called Phillips catalyst).

Polymerization is carried out continuously in a fluidized-bed reactor according to techniques known in themselves, and in equipment such as that described in French Patent No. 2,207,145 or French Patent No. 2,335,526. The process of the invention is particularly well suited to industrial-scale reactors of very large size which can have an hourly production of at least 10 tonnes of polymer. The reaction gas mixture containing the olefin and optionally the comonomers to be polymerized is generally cooled by means of at least one heat exchanger arranged outside the reactor before being recycled using a recycling pipe. Following the start-up period, the polymerization reaction is advantageously carried out as indicated in French Patent No. 2,666,337.

The polymer produced at the end of the start-up period may be a homopolymer of the olefin or a copolymer of the olefin with at least one comonomer. It can be a high-density ethylene (co)polymer having a relative density ranging from 0.934 to 0.960 and a melt flow index $MI_{2.16}$, measured under 2.16 kg and at a temperature of 190° C., ranging from 0.8 to 100 g per 10 minutes. It can also be an ethylene copolymer having a relative density ranging from 0.920 to 0.936 and a melt flow index $MI_{2.16}$ ranging from 0.6 to g per 10 minutes. The polymer and in particular polyethylene can have a molecular mass distribution ranging from 1 to 20, preferably from 2 to 10. It can have a transition metal content ranging from 0.5 to 5 ppm, preferably from 1 to 4 ppm, and a comonomer content ranging from 0 to 5% by weight.

FIG. 1 diagrammatically represents a fluidized-bed, gas-phase, polymerization reactor (1) composed essentially of a vertical cylinder (2), surmounted by a disengagement vessel (3), equipped in its lower part with a fluidization grid (4) and of a recycling pipe (5) connecting the top of the disengagement vessel to the lower part of the reactor situated under the fluidization grid, which is equipped with one or more heat exchangers (6), with a compressor (7) and with feed pipes for olefin (8), for comonomer (9), for hydrogen (10) and for inert gas such as nitrogen (1). The reactor is also equipped with a feed pipe for catalyst (12) and with a pipe for withdrawing polymer (13).

Method for Measuring the Molecular Mass Distribution

In the present invention, the molecular mass distribution of the polyethylenes is calculated by the ratio of the weight-average molecular mass, $M_w$, to the number-average molecular mass, $M_n$, from a curve obtained by a Waters 150 CV ® G.P.C. device equipped with refractometric detection and with a set of three 25-cm Shodex AT 80/MS ® columns arranged in series. The operating conditions are as follows:

solvent: 1, 2, 4, trichlorobenzene [sic] (T.C.B.)

flow rate: 1 ml per minute temperature: 145° C.

concentration of the sample analysed: 0.1% by weight injection volume: 250 $\mu l$ refractometric detection calibration by a polyethylene sold by BP Chemicals S.N.C. (France) having a distribution of 17.5 and a molecular mass $M_w$ of 210,000 and by a polyethylene having a distribution of 4.3 and a molecular mass $M_w$ of 65,000.

The following example illustrates the present invention.

EXAMPLE

The operation is carried out in a fluidized-bed reactor such as is represented diagrammatically in FIG. 1 composed of a vertical cylinder with a diameter of 4.5 m and a height of 16 m. This reactor was purified beforehand, so as to have less than 2 vpm of water in the reaction gas mixture employed, according to the method described in Example 1 of European Patent Application EP-A-0180420.

The operation is carried out in a fluidized-bed reactor identical to that described in Example 1 of EP-A-0351068, in order to produce a copolymer of ethylene and of 1-butene with a relative density of 0.954.

A charging powder composed of the same copolymer is introduced into the reactor in an amount such that the height of the fluidized bed is 9 m, with a gas mixture comprising ethylene, 1-butene, hydrogen, pentane (n-pentane and iso-pentane mixture) and nitrogen under a total pressure of 1.4 MPa, the partial pressure of ethylene being 0.35 MPa and that of pentane initially being 0, the ratios of the partial pressure of 1-butene to the partial pressure of ethylene and of the partial pressure of hydrogen to the partial pressure of ethylene being equal to 0.018 and 0.49 respectively and kept constant throughout the start-up operation and beyond. The fluidization rate is initially 45 cm/s. The temperature of the fluidized bed is initially 86° C.

The charging powder thus pressurized and fluidized was treated beforehand with the reactor in order to remove the poisons present, such as water, by a method identical to that described in Example 1 of EP-A-0180420.

Subsequently, the start-up period is begun by introducing the catalyst and the cocatalyst into the reactor in the form of a prepolymer identical to that of Example 1 of EP-A-0351068, with a rate of introduction of catalyst which steadily increases from 0 to 175 kg/h during the first hours, counting from the beginning of the introduction (time zero), and subsequently remains constant and equal to the latter value.

Simultaneously, from time zero:

the ethylene partial pressure is steadily increased from 0.35 to 0.67 MPa during the first 8 hours, the latter value subsequently remaining constant, the pentane partial pressure is steadily increased from 0 to 0.05 MPa during the first 8 hours, the latter value subsequently remaining constant, the total pressure is steadily increased from 1.4 to 2.2 MPa absolute during the first 18 hours, the latter value subsequently remaining constant, the temperature of the fluidized bed is steadily increased from 86 to 91° C. during the first 4 hours, the latter value subsequently remaining constant, the fluidization rate is steadily increased from 45 to 55 cm/s during the first 18 hours, the latter value subsequently remaining constant, and the height of the fluidized bed is steadily increased from 9 to 14 m during the first 8 hours, the latter value subsequently remaining constant.

During this time, the hourly production of copolymer steadily rises from 0 to 14 tonnes/hour during the first 19 hours and then remains at this desired maximum value subsequently. No formation of agglomerate is observed during the start-up period and the copolymer obtained corresponds immediately to the required quality.

I claim:

1. In a process for starting up a gas phase olefin polymerization reaction carried out using a Ziegler-Natta type catalyst based on a transition metal in a fluidized-bed reactor, through which passes a reaction gas mixture comprising an olefin, an inert gas, and hydrogen and optionally at least one comonomer and which operates under conditions of temperature and pressure effective to start up the polymerization reaction, the improvement comprising increasing the partial pressure of the olefin and the rate of introduction of catalyst into the reactor and at the same time maintaining constant the ratios of the partial pressures of the olefin to the hydrogen and to the optional at least one comonomer.

2. The process of claim 1, wherein the duration of the start-up is between 12 and 72 hours.

3. The process of claim 1 or 2, wherein the start-up comprises one or more stationary phases, during which the throughput for introduction of catalyst and/or the olefin partial pressure are kept constant.

4. The process of claim 3, wherein the start-up comprises an initial stationary phase during which the throughput for introduction of catalyst and/or the olefin partial pressure are kept substantially constant, followed by gradual increases in both the olefin partial pressure and the throughput for introduction of catalyst.

5. The process of claim 1, wherein the ratio of the partial pressure of hydrogen to the partial pressure of the olefin is between 0.05 and 2.

6. The process of claim 1, wherein the polymerization temperature is increased during the start-up.

7. In a process for the polymerization of an olefin in the gas phase carried out using a catalyst of Ziegler-Natta type based on a transition metal in a fluidized-bed reactor, through which passes a reaction gas mixture comprising an olefin, an inert gas, and hydrogen and optionally at least one comonomer and which operates under conditions of temperature and pressure effective to start up the polymerization reaction, the improvement comprising in the start-up of the reaction increasing the partial pressure of the olefin and the rate of introduction of catalyst into the reactor and at the same time maintaining constant the ratios of the partial pressures of the olefin to the hydrogen and to the optional at least one comonomer.

8. The process of claim 7, wherein the olefin is selected from the group consisting of ethylene, propylene, 1-butene, 1-hexene, and 4-methyl-1-pentene.

9. The process of claim 8, wherein the olefin is ethylene and the comonomer is 1-butene, 1-hexene or 4-methyl-1-pentene.

\* \* \* \* \*